United States Patent
Stout, III

(10) Patent No.: US 6,904,437 B2
(45) Date of Patent: Jun. 7, 2005

(54) DATE FORMATTING SYSTEM

(76) Inventor: Wesley Stout, III, 311 E. Main St., P.O. Box 525, Ladoga, IN (US) 47954-9348

( * ) Notice: Subject to any disclaimer, the term of this patent is extended or adjusted under 35 U.S.C. 154(b) by 522 days.

(21) Appl. No.: 09/100,934

(22) Filed: Jun. 22, 1998

(65) Prior Publication Data

US 2002/0002553 A1 Jan. 3, 2002

(51) Int. Cl.[7] ............................................. G06F 17/30
(52) U.S. Cl. .............................. 707/101; 707/1; 707/6; 717/124; 717/127; 717/137
(58) Field of Search ............................... 707/1, 101, 6, 707/4; 717/124, 127, 137; 368/29; 395/701, 704

(56) References Cited

U.S. PATENT DOCUMENTS

| | | | |
|---|---|---|---|
| 2,544,148 | A | 3/1951 | Flanagan |
| 3,936,966 | A | 2/1976 | Zeiske |
| 4,233,665 | A | 11/1980 | Maehashi |
| 5,289,393 | A | 2/1994 | Kaya |
| 5,397,881 | A | 3/1995 | Mannik |
| 5,485,692 | A | 1/1996 | Seely |
| 5,526,515 | A | 6/1996 | Ross |
| 5,600,836 | A | 2/1997 | Alter |
| 5,630,118 | A | 5/1997 | Shaughnessy |
| 5,644,762 | A | 7/1997 | Soeder |
| 5,668,989 | A | 9/1997 | Mao |
| 5,719,826 | A * | 2/1998 | Lips .............................. 368/29 |
| 5,761,668 | A | 6/1998 | Adamchick |
| 5,806,063 | A * | 9/1998 | Dickens ........................ 707/6 |
| 5,845,286 | A * | 12/1998 | Colizza ....................... 707/101 |
| 5,930,506 | A * | 7/1999 | Bieler .......................... 395/704 |
| 5,950,197 | A * | 9/1999 | Beam ............................. 707/6 |
| 5,956,510 | A * | 9/1999 | Nicholas .................... 395/701 |
| 5,970,247 | A * | 10/1999 | Wolf ........................... 395/704 |
| 6,044,219 | A * | 3/2000 | Lips ........................... 717/106 |
| 6,226,791 | B1 * | 5/2001 | Carter et al. ................ 717/124 |

FOREIGN PATENT DOCUMENTS

GB 2312536 10/1997

OTHER PUBLICATIONS

Matula, "Radix Arithmetic: Digital Algorithms for Computer Architecture", Chapter 9 in Applied Computation Theory: Analysis, Design, Modeling, R. Yeh, ed., Prentice Hall, Englewood Cliffs, NewJersey, 1976.*

*Technical Approaches to Solving Year 2000 Problems*, Scientific Computing & Automation, C.E. Ship, Feb. 1998, pp. 27–30 and 32–35.

"The Year 2000 and 2–digit Dates: A Guide for Planning and Implementation, " IBM 3d ed., May 1996.

* cited by examiner

Primary Examiner—Thuy N. Pardo
(74) Attorney, Agent, or Firm—Maginot, Moore & Beck

(57) ABSTRACT

A date formatting system for a computer program to perform date operations where the dates span more than one century. In a first embodiment, a 6-integer file system in CYYDDD format is used, "C" being a variable indicating the century, YY indicating years, and DDD indicating days of the year. A second embodiment utilizes a 7-digit integer data file and is in YYYYDDD format. These two embodiments help avoid problems experienced by computer programs that use 2-digits to identify years.

2 Claims, 3 Drawing Sheets

| VARIABLE "C" | YEAR |
|---|---|
| 100-199 | → 1800-1899 |
| 200-299 | → 1900-1999 |
| 300-399 | → 2000-2099 |
| 400-499 | → 2100-2199 |
| 500-599 | → 2200-2299 |
| 600-699 | → 2300-2399 |

MAY 2, 2000

FEBRUARY 3, 1998

DATE FORMATTING SYSTEM

BACKGROUND OF THE INVENTION

1. Field of the Invention

The present invention relates to a method for operating a computer system to perform date operations, and more particularly, to a method for operating a computer system to accurately perform date operations spanning centuries.

2. Description of the Related Art

Most existing computer application software treats a date in a format similar to "MM/DD/YY" or "YY/DDD," using 2 digits of a 4 digit year number, resulting in 2 digit year numbers. For example, the year 1998 is input, stored, processed and displayed as "98". However, starting at the year 2000, this treatment will cause problems because "00" could be interpreted as either "1900" or "2000," and, for example, the length of a period from 1998 to 2000 could be negative if 98 is subtracted from 2000. This problem is known as the "Year 2000 (Y2K) Problem" in the industry, and has been considered a crisis.

Several inventions attempt to solve the Y2K problem by providing complex and expensive computer programs. A discussion of related, representative art follows.

One such invention is described in U.S. Pat. No. 5,289,393 which issued to S. Kaya on Feb. 22, 1994. This invention is a portable electronic apparatus having a calendar feature which stores the year in 4 digits.

U.S. Pat. No. 5,600,836 which issued to H. Alter on Feb. 4, 1997, discloses a system and method for processing date-dependent information which spans one or two centuries. The invention includes time change interfaces that convert date data from local time to zone time so that all of the dates are in one century, as well as a method of converting from zone time back to local time.

U.S. Pat. No. 5,630,118 which issued to D. P. Shaughnessy on May 13, 1997, discloses a system and method for modifying and operating a computer system to perform date operations on date fields spanning centuries. The system comprises a subroutine that determines which dates within the program correspond to specified date criteria and performs a date operation on the date field.

U.S. Pat. No. 5,644,762 which issued to T. B. Soeder on May 14, 1996, discloses a method and apparatus for recording and reading date data having coexisting formats. The invention uses a system whereby years past 1999 are stored as binary integers in fields previously reserved for representations of years as two decimal digits, so that the last two decimal digits will be able to coexist for at least ten thousand years.

U.S. Pat. No. 5,668,989 which issued to D. Mao on Sep. 16, 1997, discloses a system employing two-digit hybrid radix year numbers for the year 2000 and beyond. This system treats the higher digit as hexadecimal, but displays the digit in a decimal-like style, while the lower digit is treated as ordinary decimal, so that the year 1900 is represented by 00 and the year 2000 is represented as '00.

British Patent No. 2,312,536 which was published on Oct. 29, 1997 and issued to Anderson et al., discloses a method and apparatus for identifying and correcting date errors. The invention consists of a suite of computer programs used together to detect and correct year 2000 problems in a personal computer. One aspect of the invention involves correcting the century value of the date operations a computer when the computer rolls over to the year 2000.

Lastly, *The Year* 2000 *and* 2-*Digit Dates: A Guide for Planning and Implementation*, 3d ed., published by IBM in May, 1996, discloses three solutions and techniques for solving "Y2K" problems. The first technique involves conversion to full 4-digit year formats (DDDD) from 2-digit year (DD) formats, the second technique involves windowing techniques, namely, externalizing 2-digit or 4-digit year formats, and the third technique involves using a 2-digit encoding/compression scheme, whereby 4-digit year data are compressed into 2-digit existing space.

None of the above inventions and patents, taken either singularly or in combination, is seen to describe the instant invention as claimed. Thus, a date formatting system solving the aforementioned problems is desired.

SUMMARY OF THE INVENTION

The present invention provides a method which can be incorporated into the application processing logic of a computer program whose date operations would otherwise fail as a result of date operations utilizing 2-digit representation for the year. For example, the 2-digit code "00" could be representative of either the year 1900 or the year 2000.

According to a first embodiment of the invention, a 6-integer file system in CYYDDD format is used, "C" being a variable indicating the century. A second embodiment utilizes a 7-digit integer data file and is in YYYYDDD format. These two embodiments help avoid "year 2000" problems by using a year format in excess of 2-digits.

Accordingly, it is a principal object of the invention to provide a date formatting system that enables computer programs to avoid the "year 2000" crisis.

It is another object of the invention to provide a date formatting system that is easy to use in conjunction with a computer program.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
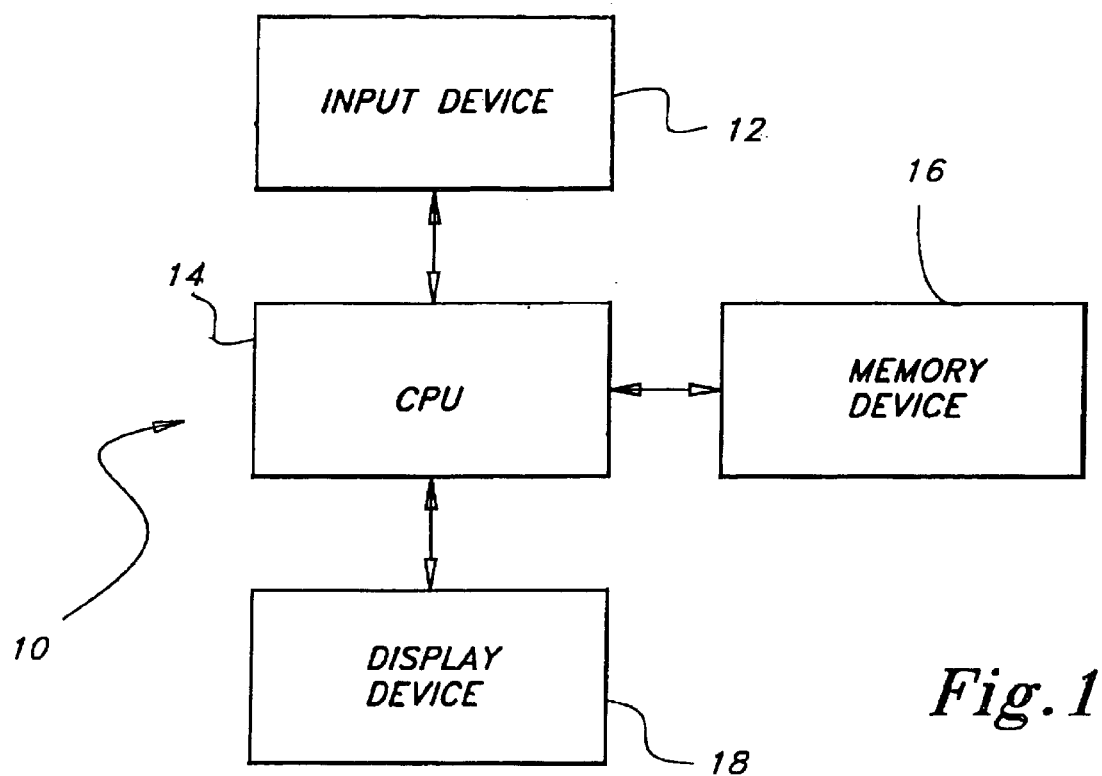
FIG. 1 is a schematic block diagram of a computer system that may be used to practice the date formatting system according to the present invention.

Referring to the drawings wherein like numerals represent like elements, FIG. 1. illustrates an exemplary computer system 10 that may include the date formatting system of the present invention. The computer system 10 has an input device 12, a CPU (central processing unit) 14, a memory device 16 and a display device 18. The operation of the computer system 10 is governed by a computer software program that is stored in the memory device 16.

A typical software program has numerous routines that perform the tasks that the program was designed to perform, such as alphabetize, sort or otherwise move text. More often than not, such programs additionally include a routine such as a date operation such as a date comparison.

Figure 2:
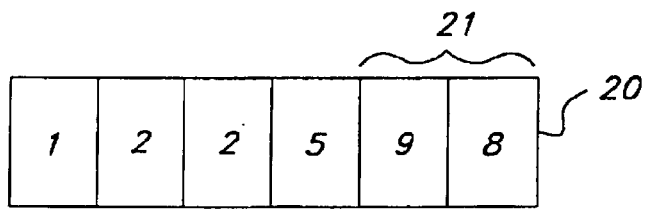
FIG. 2 is a diagram of a sample data file of the prior art.
Figure 2:
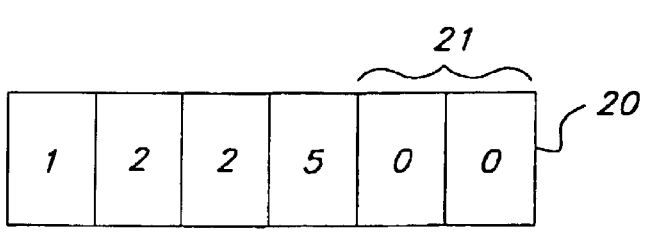

The date operations often encoded in such software programs use a two-digit representation for the year. In such a case, the date operations may be erroneously performed when processing dates after Dec. 31, 1999 for the reasons discussed above. FIG. 2 shows prior art data files 20 utilizing such a two-digit representation for the year 21, each data file having 6 integers. For illustrative purposes, Dec. 25, 1998 and Dec. 25, 2000 are shown in MMDDYY format, a two year difference existing between these two dates. When Dec. 25, 2000 is subtracted from Dec. 25, 1998, a 98-year difference is shown, clearly an error associated with the Y2K problem.

Figures 3, 4:
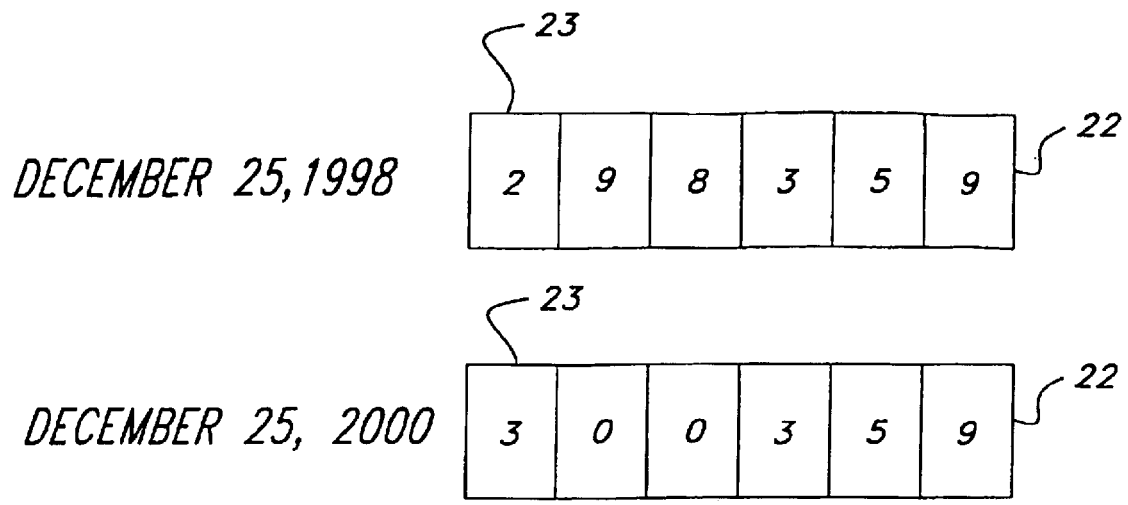
FIG. 3 is a diagram of a sample data file of the first embodiment of the invention.
FIG. 4 is a data conversion chart used to practice the present invention

Referring now to FIGS. 3–4, the date formatting system according to the first embodiment of the present invention is shown. The first embodiment also utilizes a 6-integer file system 22, as shown in FIG. 3, so that the system takes up no more memory than systems of the prior art. However, rather than storing date data in MMDDYY format, the first embodiment stores it in CYYDDD format, "C" indicating the century 23.

For example Dec. 25, 1998 would be shown as 298359, as shown in FIG. 4., "2" indicating the 20th century, "98" indicating the year, and "359" indicating the 359th day of the year. Therefore, when Dec. 25, 1998, or 298359 is subtracted from Dec. 25, 2000, or 300359, a difference of two years is shown, or 002000, indicating two years, zero days. Similarly, subtracting Jun. 1, 1998, or 298152, from Jul. 17, 2007, or 307198 results in the difference of 009046, or nine years and 46 days.

Adding days to these six-integer files will similarly avoid any Y2K problems. For, example to determine the date 2 years and 200 days from Jan. 1, 1999, simply add 002200+299001, which is equal to 301201 or Jul. 20, 2001.

Figure 5:
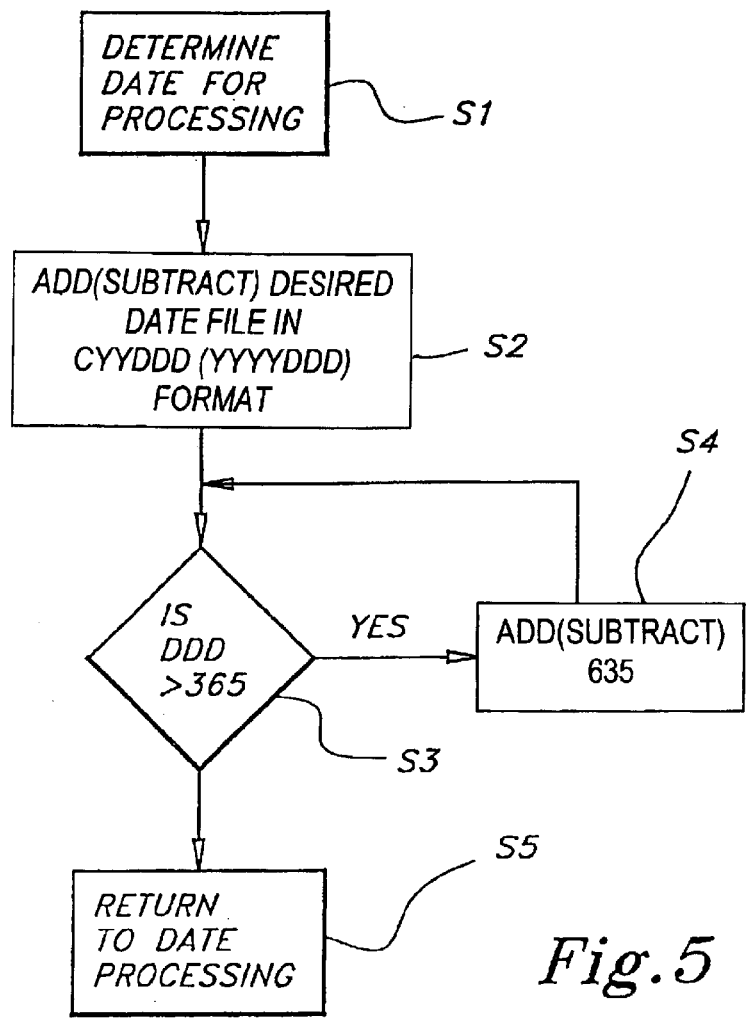
FIG. 5 is a flowchart illustrating the steps the date formatting system takes when adding days of the year.

Referring now to FIG. 5, the procedure performed when adding days to a certain date is illustrated. For example processing the date Mar. 30, 1999, is shown at step S1. At step S2, the computer would then add days to this date. For example, adding four years 300 days Mar. 31, 1999, which in CYYDDD format is 004300+299090. The result yielded is 303390. In step S3 the system determines whether the last three integers in the file, or the DDD portion is in excess of 365, or 366 in the event of a leap year. In such a case, the system adds 635 to this number, as shown in step S4. This would change the result 303390 to 304025, or Jan. 25, 2004. Should the DDD portion be less than 365, or 366 in the event of a leap year, then the system returns to date processing, as shown in step S5.

Figure 6:
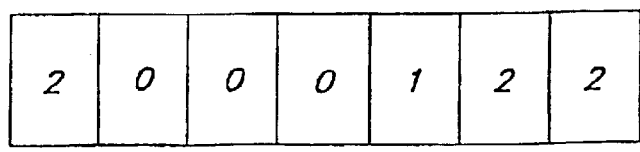
FIG. 6 is a diagram of a sample data file of the second embodiment of the invention.
Figure 6:
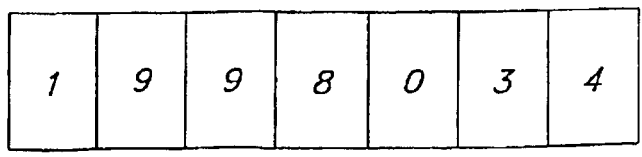

Referring now to FIG. 6, a second embodiment of the date formatting system is shown. The first embodiment utilizes a 6-integer data file 22, shown in FIG. 3, and is in CYYDDD format with the first integer functioning as a century variable 23. The second embodiment utilizes a 7-digit integer data file 24 and is in YYYYDDD format. While the second embodiment uses a slightly larger data file 22 that the 6-digit integer data file of the first embodiment, the second embodiment relies on a simpler date operation process, as there is no "C" variable.

As shown in FIG. 6, May 2, 2000 is shown in YYYYDDD format, or 2000122, and Feb. 3, 1998 is shown as 1998034. Subtracting 1998034 from 2000122 yields 0002088, or 2 years, 88 days. In the event that the DDD format is greater than 365, or 366 in the event of a leap year, a procedure similar to that in FIG. 5 is utilized.

It is to be understood that the present invention is not limited to the embodiments described above, but encompasses any and all embodiments within the scope of the following claims.

I claim:

1. A series of operational steps to be performed by a computer, said steps comprising:

storing a plurality of date files within the computer, each said date file having 7 integers including;

a 4-digit decimal year represented in the first four integers of said 7 integers;

a 3 digit decimal day represented in the last three integers of said 7 integers;

in a central processing unit of the computer, adding said 7 integers of one of said plurality of date files to said 7 integers of another of said plurality of date files to generate a sum: and adding 635 to said sum when the last three integers of said sum is in excess of 365 to generate a new date file representative of a new calendar date.

2. A series of operational steps to be performed by a computer, said steps comprising:

storing a plurality of date files within the computer, each said date file having 7 integers including;

a 4-digit decimal year represented in the first four integers of said 7 integers;

a 3 digit decimal day represented in the last three integers of said 7 integers;

in a central processing unit of the computer, subtracting said 7 integers of one of said plurality of date files from said 7 integers of another said plurality of sate files to generate a difference: and subtracting 6354 from said difference when the last three integers of said difference is in excess of 365 to generate a new date file representative of the number of years and days difference between the date files.

* * * * *

Disclaimer

6,904,437—Wesley Stout, III, 7661 E.CO.RD. 475 S. Fillmore, IN (US) 46128. DATE FORMATTING SYSTEM. Patent dated Jun. 7, 2005. Disclaimer filed Jan. 10, 2006, by the inventor.

The term of this patent, Subsequent to the term number 6,904,437 has been disclaimed.

*Official Gazette, March 21, 2006*